United States Patent [19]

Brand et al.

[11] Patent Number: 4,923,518

[45] Date of Patent: May 8, 1990

[54] CHEMICALLY INERT PIGMENTARY ZINC OXIDES

[75] Inventors: John R. Brand; Thomas I. Brownbridge, both of Oklahoma City; James W. Kauffman, Edmond, all of Okla.

[73] Assignee: Kerr-McGee Chemical Corporation, Oklahoma City, Okla.

[21] Appl. No.: 284,628

[22] Filed: Dec. 15, 1988

[51] Int. Cl.$^5$ ............................................. C08H 17/04
[52] U.S. Cl. ..................................... 106/429; 106/431
[58] Field of Search ...................... 106/425, 429, 431

[56] References Cited

U.S. PATENT DOCUMENTS

| | | | |
|---|---|---|---|
| Re. 27,818 | 11/1973 | Werner | 106/300 |
| 1,997,925 | 4/1935 | Eide | 106/429 |
| 2,068,066 | 1/1937 | O'Brien | 106/429 |
| 2,118,511 | 5/1938 | Hucks | 106/429 |
| 2,303,329 | 12/1942 | Cyr | 106/429 |
| 2,785,990 | 3/1957 | Coulter | 106/429 |
| 2,885,366 | 5/1959 | Iler | 252/313 |
| 2,913,419 | 11/1959 | Alexander | 252/313 |
| 3,042,539 | 7/1962 | Csonka | 106/429 |
| 3,083,113 | 3/1963 | Korf et al. | 106/254 |
| 3,348,959 | 10/1967 | Csonka | 106/429 |
| 3,576,656 | 4/1971 | Webb et al. | 106/296 |
| 3,846,148 | 11/1974 | Nordyke | 106/431 |
| 3,852,087 | 12/1974 | Nordyke | 106/431 |
| 4,130,442 | 12/1978 | Petersen | 106/429 |
| 4,334,933 | 6/1982 | Abe et al. | 106/305 |
| 4,619,995 | 10/1986 | Reid et al. | 524/91 |

OTHER PUBLICATIONS

Encylopedia of Chemical Technology, 2ed. vol. 21, pp. 369–379 and pp. 402–405 (1968).
Encylopedia of Chemical Technology, 2ed. vol. 22, pp. 589–593 (1968).

*Primary Examiner*—Peter D. Rosenberg
*Attorney, Agent, or Firm*—Herbert M. Hanegan; John P. Ward

[57] ABSTRACT

Chemically inert pigmentary zinc oxide compositions, useful in producing UV light stable polymeric resin compositions are prepared by wet treatment of chemically reactive zinc oxide base pigments utilizing a process wherein chemically inert organic or inorganic coatings are deposited thereon.

37 Claims, No Drawings

CHEMICALLY INERT PIGMENTARY ZINC OXIDES

FIELD OF THE INVENTION

The present invention relates to chemically inert pigmentary compositions of matter suitable for use as ultraviolet light absorbents in polymeric resin compositions. More particularly, this invention relates to (i) ultraviolet light absorbing, chemically inert pigmentary compositions of matter comprised of particles having cores of chemically reactive pigmentary zinc oxide, the cores having deposited thereon one or more chemically inert coatings, (ii) processes for their preparation and (iii) polymeric resin compositions containing ultraviolet light stabilizing amounts of these pigmentary compositions of matter.

BACKGROUND OF THE INVENTION

It is widely known that ultraviolet (UV) light radiation, whether from a natural source such as the sun or an artificial source such as interior lighting, can accelerate both the physical and chemical deterioration or breakdown of polymeric resin materials. For example, it is known that UV light radiation causes the photodegradation of polyolefin resins such as polyethylene and polypropylene, the dehydrohalogenation of polyvinylhalide resins such as poly(vinylchloride) and the embrittlement of polyvinylaromatic resins such as polystyrene.

To protect these and other polymeric resin materials against the deleterious effects of UV light radiation, various commercial UV light absorbing additive agents have been developed. These commercial UV light absorbing additive agents generally provide protection to the polymeric resin material either by absorbing the UV light radiation directly or by harmlessly dissipating this particular light energy through intermolecular energy processes with the polymeric resin.

In the main, the most widely used commercial UV light absorbing additive agents are materials that are organic in nature and typically can be grouped into five basic categories. These groups are (1) hydroxybenzophenones, (2) hydroxyphenylbenzotriazoles, (3) salicylates, (4) arylsubstituted acrylates and (5) aminobenzoates. Other miscellaneous UV light absorbers that have been used include various nickel chelates, nickel complexes and nickel salts of various aromatic compounds.

One inorganic material that is known to be useful as an additive agent to provide UV light stability to polymeric resin materials is the pigmentary metal oxide, titanium dioxide. In U.S. Pat. No. 4,619,957 it is disclosed, for example, that pigmentary titanium dioxide can be added to rigid poly(vinylchloride) resins not only to provide for the proper pigmentation of formulations based on these particular resins but also to prevent significant color variations from occurring in products fabricated therefrom upon subsequent exposure to UV light radiation. However, according to this patent, a problem associated with the use of titanium dioxide in such formulations is that, due to its high opacity and tinting strength, products fabricated from such formulations can be produced only in white or pastel colors. Although darker shades or colors can be obtained either by adding larger amounts of colorant or by reducing the concentration of the pigment, such approaches only add to the cost of such formulations or reduce the UV light stability of finished products prepared therefrom.

While it is clear from the above disclosures that many different UV light absorbing additive agents have been employed to provide UV light stability to various polymeric resin materials, a need still exists for UV light absorbing agents that are less costly than the above disclosed organic agents and which are capable of overcoming the drawbacks associated with such inorganic agents as titanium dioxide. The UV light absorbing pigmentary compositions of matter of the present invention fulfill this need.

SUMMARY OF THE INVENTION

The present invention is directed to pigmentary compositions of matter which are capable of providing protection to products fabricated from polymeric resins that are susceptible to degradation by UV light radiation. More particularly, the present invention is directed to UV light absorbing chemically inert pigmentary compositions of matter comprised of particles having cores of chemically reactive pigmentary zinc oxide, said cores having deposited thereon a predetermined amount of a chemically inert coating of either (a) a water insoluble metallic soap of a saturated or unsaturated monocarboxylic acid, (b) separate and distinct coatings of at least two different hydrous metal oxides and, optionally, a further encapsulating coating of the water insoluble metallic soap of a saturated or unsaturated monocarboxylic acid or (c) a coating of a single hydrous metal oxide and an encapsulating coating of the water insoluble metallic soap of a saturated or unsaturated monocarboxylic acid.

The present invention further is directed to processes for preparing the above pigmentary compositions of matter. With regard to the deposition of a coating of the water insoluble metallic soap of a saturated or unsaturated monocarboxylic acid directly upon the chemically reactive pigmentary zinc oxide core particles, a slurry of the pigmentary zinc oxide first is formed and heated to an elevated temperature. A water soluble alkali metal salt of a saturated or unsaturated monocarboxylic acid and a water soluble metallic salt then are added to the slurry to effect the formation and precipitation of the coating of the water insoluble metallic soap of the monocarboxylic acid upon the pigmentary zinc oxide core particles of the slurry. The resulting monocarboxylic acid metallic soap coated pigmentary zinc oxide product finally is recovered from the slurry and comprises a composition of matter of this invention.

With respect to the preparation of compositions of matter comprised of chemically reactive pigmentary zinc oxide core particles having deposited thereon, separate and distinct coatings of at least two different hydrous metal oxides and, optionally, a further encapsulating coating of the metallic soap of a saturated or unsaturated monocarboxylic acid, again an aqueous slurry of the pigmentary zinc oxide core particles first is formed, this aqueous slurry heated to elevated temperatures and, as necessary, the pH of the heated slurry adjusted to a value of about 9.0. While maintaining the pH of the heated slurry at a value of about 9.0, a solution of a first hydrous metal oxide precursor compound is added to the heated slurry to effect a deposition of a coating of a first hydrous metal oxide upon the zinc oxide core particles. Following completion of this deposition, the pH of the heated slurry then is adjusted to a value of at least about 6.5 or lower and, while maintaining this pH value, a solution of a second hydrous metal oxide precursor is introduced into the slurry to effect a deposition upon the first hydrous metal oxide coated zinc oxide core particles of a coating of the second hydrous metal oxide. The resulting hydrous metal oxides coated pigmentary zinc oxide product either is recovered from the slurry at this time or, optionally, subjected to encapsulation in a further coating comprised of a water insoluble metallic soap of a saturated or unsaturated monocarboxylic salt. In this optional embodiment a water soluble alkali metal salt of a saturated or unsaturated monocarboxylic acid and a water soluble metallic salt are introduced into the heated slurry wherein they undergo reaction to form and precipitate an encapsulating coating of a water insoluble metallic soap upon the hydrous metal oxides coated zinc oxide core particles.

With regard to the preparation of the compositions of matter of the present invention comprised of chemically reactive pigmentary zinc oxide core particles having deposited thereon a coating of a single hydrous metal oxide and an encapsulating coating of the water insoluble metallic soap of a saturated or unsaturated monocarboxylic acid, these compositions are prepared in substantially the same manner as the compositions having separate and distinct coatings of two different hydrous metal oxides as described above. The preparation of compositions bearing only a single hydrous metal oxide coating and the encapsulating coating of the metallic soap differs from the above described process in that upon completion of the deposit of the single hydrous metal oxide coating, the water soluble alkali metal salt of a saturated or unsaturated monocarboxylic acid and water soluble metallic salt reactants are immediately added to the heated slurry.

The present invention still further is directed to UV light stabilized polymeric resin compositions comprising, in addition to a UV light degradable polymeric resin component, an effective UV light stabilizing amount of a chemically inert pigmentary zinc oxide composition as disclosed and described herein.

The UV light absorbing, chemically inert pigmentary compositions of matter of this invention possess a unique combination of properties which render them suitable either as complete or partial replacements for the organic or inorganic UV light absorbing additive agents most usually employed in UV degradable polymeric resin materials. In this regard, the pigmentary compositions of matter of this invention particularly are suited as complete or partial replacements for the pigmentary titanium dioxide most usually employed as the UV light absorbing additive agent of choice in poly(vinylchloride) resin based formulations. When incorporated into poly(vinylchloride) resin based formulations, for example, it has been found that products fabricated therefrom can be produced in a far wider range of shades and colors, including darker colors, than was heretofore possible when using titanium dioxide. It further has been found that products fabricated from such formulations also retain substantially the same outstanding UV light stability as that provided by titanium dioxide.

DETAILED DESCRIPTION OF THE INVENTION

In accordance with the present invention, novel pigmentary compositions of matter are provided comprising particles of chemically reactive pigmentary zinc oxide cores upon which is deposited one or more coatings of chemically inert materials. The pigmentary zinc oxide core particles can comprise any pigmentary zinc oxide produced by any of the conventional processes utilized to produce this material. Two such known and widely used processes include, for example, the direct (or American) process and the indirect (or French) process. Both processes involve the oxidation of zinc in the vapor state. These processes differ from each other in that in the former process, carbon reduction of a roasted zinc concentrate and oxidation of the resulting zinc vapor are carried out concurrently, whereas in the latter process, the vaporous zinc is first condensed to form what is commonly referred to as zinc slab which then is revaporized for subsequent oxidation. A more detailed description of the above mentioned direct and indirect processes for producing pigmentary zinc oxide for use in preparing the novel pigmentary compositions of matter constituting one embodiment of the present invention can be found in Kirk-Othmer, *Encyclopedia of Chemical Technology*, 2ed, Vol. 22, pp 589–593 (1968), the teachings of which are incorporated herein in their entirety.

The pigmentary zinc oxide core particles which are utilized to prepare the chemically inert pigmentary zinc oxide compositions of this invention are commercially available in a wide variety of particle shapes and sizes. Typically, the pigmentary zinc oxide core particles are available in both acicular and spherical shapes and have average particle sizes in the range of from about 0.01 to about 10.0 micron. Particularly good results can be obtained where these zinc oxide core particles have average particle sizes in the range of from about 0.1 to about 0.4 micron.

As disclosed hereinabove, the pigmentary zinc oxide core particles will have deposited thereon one or more chemically inert coatings. Such coating will comprise either (a) a coating of a precipitated water insoluble metallic soap of a saturated or unsaturated monocarboxylic acid, (b) separate and distinct coatings of at least two different hydrous metal oxides or (c) a coating of a single hydrous metal oxide and an encapsulating coating of the water insoluble metallic soap of a saturated or unsaturated monocarboxylic acid. With regard to pigmentary zinc oxide core particles bearing separate and distinct coatings of two different hydrous metal oxides, such particles also can have deposited thereon a further encapsulating coating of the metallic soap of a saturated or unsaturated monocarboxylic acid as described below.

Broadly, the water insoluble metallic soaps of saturated or unsaturated monocarboxylic acids useful in preparing the compositions of matter of the present invention will include those water insoluble metallic soaps prepared by the reaction of water soluble metallic salts with water soluble alkali metal salts of saturated or unsaturated monocarboxylic acids. In general, the water soluble metallic salts employed in preparing a water insoluble metallic soap coating upon the pigmentary zinc oxide core particles will include those metallic salts comprised of a metal cation of a heavy metal selected from Groups Ib, II, III, IV, V, VIB, VIIB and VIII of the Periodic Table of Elements and an inorganic anion moiety selected from the group consisting of nitrate, sulfate and halogen ions. Representative, but nonlimiting, examples of useful water soluble metallic salts include copper nitrate, copper chloride, calcium chloride, magnesium nitrate, zinc sulfate, zinc nitrate, aluminum sulfate, zirconium sulfate, zirconium nitrate, manganese nitrate, nickel nitrate, cobalt chloride, and the like. Particularly good results have been achieved utilizing the water soluble metallic salts, zinc sulfate and calcium chloride, to produce and deposit coatings of the corresponding water insoluble zinc and calcium soaps of various saturated and unsaturated monocarboxylic acids, particularly stearic and resin acids.

With respect to the water soluble alkali metal salts of monocarboxylic acids employed to produce the hereinabove disclosed coatings of water insoluble metallic soaps by reaction with the aforementioned metallic (or heavy metal) salts, generally these salts will comprise the sodium and potassium salts of saturated and unsaturated monocarboxylic acids selected from the group consisting of fatty acids, resin acids and naphthenic acids containing from about 7 to about 22 carbon atoms. Particularly useful alkali metal salts are the sodium and potassium salts of the fatty acids and resin acids (i.e., acids which are found in rosins occurring in the oleoresin of pine trees or in tall oil produced as a byproduct in the Kraft paper industry). Representative, but nonlimiting, examples of such alkali metal salts include the sodium and potassium salts of saturated fatty acids such as lauric acid, palmitic acid, stearic acid, and the like; unsaturated fatty acids such as oleic and linoleic acids which are the principal acid constituents in tall oil and abietic acid, levopimaric acid, pimaric acid and polustric acid which are the principal resin acids in rosin and naphthenic acids such as $\alpha$ and $\beta$- naphthoic acids.

Whether deposited directly upon the chemically reactive pigmentary zinc oxide core particles as the sole chemically inert coating thereon or as an encapsulating coating upon hydrous metal oxide coated core particles, the coating of the metallic soap readily can be formed and precipitated upon the core particles in situ in an aqueous slurry of the core particles. In this embodiment of the invention, the aqueous slurry is prepared by dispersing, in an aqueous medium such as water, either the chemically reactive (i.e., noncoated) pigmentary zinc oxide core particles or chemically inert (i.e., hydrous metal oxide coated) pigmentary zinc oxide core particles. Typically, the slurry will be made up to contain from about 5 to about 50 weight percent solids. In addition, a dispersing agent, in amounts and of a type such as disclosed hereinbelow, may be added to the slurry to maintain the pigmentary zinc oxide core particles in a highly dispersed state.

The slurry, once formed, is heated to an elevated temperature and then maintained at this elevated temperature during the addition of the water soluble alkali metal salt of the monocarboxylic acid and water soluble metallic salt reactants to the slurry and the formation and precipitation of the water insoluble metallic soap upon the core particles. Typically, the slurry will be heated to and maintained at elevated temperatures ranging from about 60° C. to about 95° C. Generally, the water soluble alkali metal salt of the monocarboxylic acid and the water soluble metallic salt reactants will be added to the heated slurry in stoichiometric proportions and in amounts sufficient to provide a coating of the desired water insoluble metallic soap ranging in weight from about 0.1 to about 10 weight percent and preferably from about 0.5 to about 5 weight percent based on the weight of the pigmentary zinc oxide core particles.

Following completion of the formation and precipitation of the metallic soap upon the pigmentary zinc oxide core particles, the slurry is maintained at the elevated temperature of reaction for a period of at least about 15 minutes to effect a cure of the coating of metallic soap. After curing, the coated pigmentary zinc oxide then is separated from the aqueous medium, washed to remove any soluble salts adhering to the zinc oxide, dried and subjected to final sizing by conventional techniques. The resulting pigmentary product comprises UV light absorbing, chemically inert pigmentary zinc oxide compositions of matter of this invention.

As disclosed hereinabove, in place of the coating of metallic soap the pigmentary zinc oxide core particles can have deposited thereon separate and distinct coatings of at least two different hydrous metal oxides such as, for example, silica, titania, alumina and zirconia. Particularly useful chemically inert pigmentary zinc oxide products of the present invention have been found to be those pigmentary zinc oxide products comprised of zinc oxide core particles upon which is deposited a first coating of dense amorphous silica and over this first coating, a second coating of precipitated alumina. The sources of silica and alumina useful for providing these separate and distinct coatings and the procedures employed for their formation and deposition upon the chemically reactive zinc oxide core particles are described below in conjunction with a further embodiment of this invention. In general, the amount of silica deposited as a dense amorphous silica first coating upon the zinc oxide core particles will range in weight from about 0.1 to about 25 weight percent based upon the weight of the pigmentary zinc oxide core particles, preferably from about 1 to about 15 weight percent. The amount of precipitated alumina deposited as the second coating upon the silica coated pigmentary zinc oxide core particles, typically will be an amount sufficient to provide for easy separation and recovery of the finished pigmentary composition and for ready dispersibility of the finished pigmentary composition in the polymeric resin compositions described hereinbelow. In general, such amounts will range from about 0.5 to about 10.0 weight percent, based upon the weight of the zinc oxide core particles, with amounts ranging from about 1 to about 4 weight percent being most preferred.

As a further embodiment of the present invention, a process also is provided for preparing the above hydrous metal oxide coated pigmentary zinc oxide compositions. In accordance with this embodiment of the invention which is described herein specifically with reference to the deposition of silica and alumina coatings, an aqueous slurry first is prepared by dispersing in an aqueous medium such as water, the chemically reactive (i.e., noncoated) pigmentary zinc oxide core particles in an amount sufficient to produce a slurry containing from about 5 to about 50 weight percent solids. In addition, a dispersing agent, soluble in the aqueous medium, may be added to the slurry to maintain the pigmentary zinc oxide core particles in a highly dispersed state. Representative, but nonlimiting, examples of useful dispersing agents include the water soluble alkali metal silicate compounds described hereinbelow as well as other water soluble inorganic compounds such as sodium hexametaphosphate, sodium polyphosphate, sodium hydroxide and the like. The preferred materials for use as dispersing agents are the alkali metal silicates. In general, the amount of dispersing agent employed will be small and typically will range from about 0.01 to about 0.5 weight percent of the weight of the zinc oxide core particles contained in the slurry.

The slurry, once formed, is heated to an elevated temperature and maintained at this elevated temperature throughout the remainder of the process. For purposes of practicing this embodiment of the invention, elevated temperatures in the range of from about 60° C. to about 95° C. are utilized.

At this point, the heated slurry can have a pH ranging from about 7.5 to about 9.5. To initiate the deposition of the dense amorphous silica coating, it is necessary that the pH of the heated slurry be at a value of about 9.0. Thus, in the event the initial pH of the heated slurry is below a value of about 9.0, adjustment of the slurry pH will be necessary. This adjustment readily can be accomplished by the addition of an alkali such as sodium hydroxide. However, care must be exercised in making this pH adjustment, since zinc oxide is amphoteric and therefore readily soluble in both strongly acidic and strongly alkaline environments. Most usually, only sufficient alkali will be added to raise the initial pH of the slurry to a value of about 9.0. At this pH value the zinc oxide will not be attacked by the alkaline aqueous phase of the slurry but precipitation and deposition of the silica upon the zinc oxide will commence.

Following heating of the slurry and, if necessary, adjustment of its pH to a value of about 9.0, a water soluble silicate compound is added to the slurry in an amount sufficient to provide the desired amount of the dense amorphous silica coating upon the pigmentary zinc oxide core particles. In general, the amount of silica in the coating will range from about 0.1 to about 25 weight percent and preferably from about 1 to about 15 weight percent calculated as $SiO_2$ and based on the weight of the zinc oxide core particles contained in the slurry. For purposes of this invention any water soluble silicate compound capable of providing silica for deposition upon the pigmentary zinc oxide core particles under the operating conditions of the process can be employed. Most usually the water soluble silicate compound of preference is sodium silicate. However, other water soluble alkali metal silicates known to precipitate silica from solution under the substantially alkaline conditions described above can be employed.

As disclosed hereinabove, during the period of initial deposition of the precipitated silica and formation of the essentially continuous and solid coating of silica upon the pigmentary zinc oxide core particles, it is necessary to maintain the pH of the heated slurry at a value of about 9.0. Maintenance of this pH value during the initial deposition and formation period readily can be accomplished by the concurrent but separate addition of a suitable acid such as sulfuric acid, hydrochloric acid, nitric acid, acetic acid and the like. As the deposition and formation of the essentially continuous and solid coating of silica upon the pigmentary zinc oxide core particles proceeds, the pH of the heated slurry is raised in a stepwise, incremental manner from the pH value of about 9.0 to a pH value of about 10.5. This stepwise, incremental increase in the pH of the heated slurry readily can be effected by adjusting the respective amounts of the silicate and acid components being added concurrently, but separately, to the slurry.

Following completion of the addition of the water soluble silicate compound and deposition of the dense amorphous silica coating upon the pigmentary zinc oxide core particles, acid addition is continued in order to reduce the pH of the heated slurry to a pH value of about 6.5 or lower and preferably to a pH value of from about 5.5 to about 6.5. Once this reduction in the pH of the heated slurry has been completed, addition of a water soluble aluminum-containing compound capable of providing a coating of precipitated alumina upon the dense amorphous silica coated pigmentary zinc oxide core particles is commenced. During this addition of the water soluble aluminum-containing compound, the pH of the heated slurry is maintained at said pH value of about 6.5 or lower and preferably between about 5.5 and 6.5 by the concurrent, but separate, addition of an acid such as disclosed above.

The water soluble aluminum-containing compounds useful in providing the coating of precipitated alumina can be either alkaline or acidic in nature. Representative, but nonlimiting, examples of useful aluminum-containing compounds include compounds such as sodium aluminate, aluminum sulfate and the like. Of the various aluminum-containing compounds useful in providing the coating of alumina, sodium aluminate is the preferred material.

The addition of the water soluble aluminum-containing compound is continued until a coating containing a predetermined amount of precipitated alumina is obtained. Generally, this addition is continued until a coating containing from about 0.5 to about 10 weight percent and preferably from about 1 to about 4 weight percent of precipitated alumina, calculated as $Al_2O_3$ and based on the weight of the zinc oxide core particles contained in the slurry, is obtained.

Upon completion of the addition of the aluminum-containing compound the coated pigmentary zinc oxide is separated from the slurry, washed to remove any soluble salts adhering to the zinc oxide, dried and subjected to final sizing by conventional techniques. The resulting products comprise UV light absorbing, chemically inert pigmentary zinc oxide compositions of matter of this invention.

In an optional (or alternative) embodiment, a further encapsulating coating of a water insoluble metallic soap, such as disclosed above, can be deposited upon the silica and alumina coated pigmentary zinc oxide core particles prior to the separation of said particles from the heated slurry. This encapsulating coating of the water insoluble metallic soap will be deposited upon the silica and alumina coated pigmentary zinc oxide core particles utilizing the techniques described above for depositing the metallic soap coating directly to non-coated core particles. Thus, in this embodiment, the encapsulating coating is formed by adding the alkali metal salt of a monocarboxylic acid and the metallic salt reactants to the heated slurry of the silica and alumina coated core particles in stoichiometric proportions and in amounts sufficient to provide an encapsulating coating of the water insoluble metallic soap ranging in weight from about 0.1 to about 10 weight percent and preferably from about 0.5 to about 5.0 weight percent based on the weight of the zinc oxide core particles. The heated slurry then is maintained at elevated temperatures (e.g., from about 60° C. to about 95° C.) for a period sufficient to form and precipitate the metallic soap upon the silica and alumina coated pigmentary zinc oxide particles contained in the slurry. Following curing of the encapsulating coating of the precipitated metallic soap the resulting coated pigmentary zinc oxide product is recovered in a manner such as described immediately above.

Also as disclosed herein, the pigmentary zinc oxide core particles can have deposited thereon a coating of a single hydrous metal oxide such as, for example, the metal oxides silica, titania, alumina and zirconia as disclosed hereinabove. When the pigmentary zinc oxide core particles have deposited thereon but a single hydrous metal oxide, then the core particles will have deposited thereon a further encapsulating coating of a water insoluble metallic soap of a saturated or unsaturated monocarboxylic acid such as described hereinabove to further reduce the photocatalytic activity of the zinc oxide core particles. With regard to this particular embodiment, particularly useful chemically inert pigmentary zinc oxide products have been found to be those pigmentary zinc oxide products comprised of zinc oxide core particles upon which is deposited a coating of dense amorphous silica and an encapsulating coating of zinc stearate or calcium rosinate. Further with regard to this particular embodiment, while the amount of the single hydrous metal oxide contained in the coating thereof will depend upon the particular hydrous metal oxide employed, in general, the amount will range from about 0.1 to about 25 weight percent and preferably from about 1 to about 15 weight percent based upon the weight of the pigmentary zinc oxide core particles. With respect to the encapsulating coating of the water insoluble metallic soap deposited upon the zinc oxide core particles, this coating will range in weight from about 0.1 to about 10 weight percent and preferably from about 0.5 to about 5.0 weight percent based upon the weight of the pigmentary zinc oxide core particles.

The preparation of the above described composition of matter comprising pigmentary zinc oxide core particles having deposited thereon a coating of a single hydrous metal oxide and an encapsulating coating of a water insoluble metallic soap can be prepared using substantially the same process as described hereinabove for the preparation of the chemically inert pigmentary zinc oxide products comprised of zinc oxide core particles having deposited thereon separate and distinct coatings of at least two different hydrous metal oxides and the optional encapsulating coating of the water insoluble metallic soap. The process for preparing the compositions of matter of this particular embodiment differs from the process described immediately above in that once the deposition of the single hydrous metal oxide coating upon the zinc oxide core particles is completed the addition of the water soluble alkali metal salt of the saturated or unsaturated monocarboxylic acid and the water soluble metallic salt immediately is commenced. As in the process disclosed above, the heated slurry then is maintained at elevated temperatures (e.g., from about 60° C. to about 95° C.) for a period sufficient to form and precipitate the metallic soap upon the hydrous metal oxide coated pigmentary zinc oxide particles contained in the slurry. Again, following curing of the encapsulating coating of the precipitated metallic soap, the resulting coated pigmentary zinc oxide product can be recovered using conventional techniques.

As a further embodiment of the present invention, there also are provided UV light stabilized polymeric resin compositions comprised of a polymeric resin component and an effective UV light stabilizing amount of the UV light absorbing chemically inert pigmentary zinc oxide compositions of matter described above. The polymeric resin component, useful in preparing the polymeric resin compositions of this invention, broadly will comprise any polymeric resin material which is susceptible to degradation by UV light radiation and which is useful for fabrication into products such as protective and decorative coatings, film and sheeting and any other molded, extruded or calendered products capable of being produced from such polymeric resins. For purposes of this embodiment of the present invention, the polymeric resin component will include such known polymeric resins as polyolefin resins, acrylic resins, polyester resins, polyamide resins, epoxy resins, phenolic resins, poly(vinylaromatic) resins, poly(vinylhalide) resins, polycarbonate resins, polyurethane resins and the like. Representative, but nonlimiting, examples of such polymeric resins include polyolefin resins such as polyethylene, polypropylene and polybutylene resins and the like; acrylic resins such as poly(acylic acid), poly(methacrylic acid), poly(methyl acrylate), poly(ethyl acrylate), poly(propyl acrylate), poly(methyl methacrylate), (poly ethyl methacrylate), poly(acrylamide), poly(acrylic acid/acrylamide), poly(acrylic acid/methyl acrylate) and the like; polyesters such as poly(ethylene terephthalate) and poly(butylene terephthalate) and the like; polyamide resins such as nylon-6 and nylon-6,6 and the like; epoxy resins such as poly(epichlorohydrin/bisphenol A) and the like and esters thereof such as the epoxy resin esters prepared by the esterification of poly (epichlorohydrin/bisphenol A) with a fatty acid, rosin acid, tall oil acid or mixtures thereof; phenolic resins such as those prepared by reaction of formaldehyde with phenol, resorcinol, cresol, xylenol, p-tertbutylphenol, p-phenylphenol and the like; poly(vinylaromatic) resins such as polystyrene and copolymers and terpolymers thereof such as poly(styrene-acrylonitrile) resins and poly(styrene-butadiene-acrylonitrile) resins and the like; polycarbonate resins such as those obtained either by the phosgenation of dihydroxy aliphatic and aromatic monomers such as ethylene glycol, propylene glycol, bisphenol A (4,4'-isopropylidene diphenol) and the like or by the base catalyzed transesterification of such dihydroxy aliphatic and aromatic monomers with a dialkyl or diaryl carbonate as represented by the transesterification of bisphenol A with diphenyl carbonate to produce bisphenol A polycarbonate; and polyurethane resins obtained by the reaction of di-or poly-functional hydroxy compounds such as glycols and hydroxyl terminated polyesters and polyethers with di-or poly-functional diisocyanates.

Particularly useful UV light stabilized polymeric resin compositions of the present invention, however, are those resin compositions wherein the polymeric resin component comprises a poly(vinylhalide). The preferred poly(vinylhalide) resins for use as the polymeric resin component includes poly(vinylchloride) homopolymer resins as well as poly(vinylchloride) copolymer resins resulting from the copolymerization of vinyl chloride monomer with a second monomer such as, for example, other unsaturated halogenated hydrocarbons, styrene and its halogenated derivatives, vinyl esters and ethers, olefins, dienes, esters and other derivatives of acrylic and methacrylic acids, olefins, dicarboxylic acids and esters thereof. Representative examples of such copolymerizable second monomers or comonomers include vinylidene chloride, vinyl acetate, vinyl isobutyl ether, ethylene, propylene, isoprene, butadiene, methyl acrylate, methyl methacrylate and the like. Typically, commercially available poly(vinylchloride) copolymer resins can contain from about 2 to about 20 weight percent of the copolymerized comonomer. A more detailed description of poly(vinylchloride) homopolymer and copolymer resins useful as the polymeric resin component in the ultraviolet light stabilized polymeric resin compositions of this invention can be found in Kirk-Other, *Encyclopedia of Chemical Technology*, 2ed, Vol. 21, pp 369–379 and pp 402–405 (1968) the teachings of which are incorporated herein in their entirety by reference. Particular poly(vinylchloride) resins useful for preparing the UV light stabilized polymeric resin compositions of this invention are the rigid poly(vinylchloride) homopolymer resins.

As disclosed above, the polymeric resin compositions of this invention will comprise a polymeric resin component and an effective UV light stabilizing amount of the herein described UV light absorbing, chemically inert pigmentary zinc oxide compositions of matter. Typically, these polymeric resin compositions will contain from about 2 to about 20 weight percent of the pigmentary zinc oxide composition based on 100 parts by weight of the polymeric resin component in the polymeric resin composition. With particular regard to the above described poly(vinylchloride) resins it surprisingly has been found that while these amounts provide substantially the same degree of UV light stability as equivalent amounts of pigmentary titanium dioxide, the use of the pigmentary zinc oxide composition does not give rise to the aforementioned drawback associated with the use of pigmentary titanium dioxide. That is, when a pigmentary zinc oxide composition of this invention is incorporated into a poly(vinylchloride) resin to form a polymeric resin composition of this invention, significantly darker shades or colors can be attained compared to poly(vinylchloride) resin compositions containing an equivalent amount of titanium dioxide and colorant. Utilizing the pigmentary zinc oxide compositions of this invention, it also is possible to obtain the same lighter shades or colors as in polymeric resin compositions containing pigmentary titanium dioxide, but at substantially lower concentrations of the colorant.

The UV light stabilized polymeric resin compositions of this invention further can contain other conventional additives known in this art. Representative but nonlimiting examples of such conventional additives include thermal stabilizers, impact modifiers, lubricants or processing acids, fillers, both organic and inorganic color pigments and plasticizers. These ingredients can be incorporated into the polymeric resin compositions by conventional blending techniques including, for example, extruder, Banbury or dry powder mixing.

As mentioned hereinabove, particularly useful UV light stabilized polymeric resin compositions are those compositions preferably containing a poly(vinylchloride) resin as the polymeric resin component. Such poly(vinylchloride) resin compositions containing the pigmentary zinc oxide compositions of this invention, either as complete or partial replacements for the more commonly employed titanium dioxide, exhibit excellent stability during processing and excellent UV light stability upon exposure to the sun. The stability of poly(vinylchloride) resin compositions containing the pigmentary zinc oxides of this invention particularly is unexpected and surprising since untreated zinc oxides are known to accelerate the dehydrochlorination of poly(vinylchloride) resins. Thus, based on the demonstrated inability of the treated pigmentary zinc oxides of this invention to accelerate the dehydrochlorination of the poly(vinylchloride) resins these treated pigmentary zinc oxides are considered to be essentially chemically inert.

The following examples are intended to illustrate the various embodiments of this invention. In these examples all parts or percentages are by weight unless otherwise specified.

EXAMPLE 1

This examples illustrates the preparation of a typical chemically inert pigmentary zinc oxide composition of this invention utilizing the process constituting a further embodiment of the invention.

Six hundred grams of zinc oxide manufactured by the Zinc Corporation of America and bearing the grade designation Kadox 930 were dispersed in sufficient water in a Waring blender to produce a slurry containing a solids content of about 30 weight percent. To this slurry further was added a sodium silicate solution, having a weight ratio of $SiO_2:Na_2O$ of about 3.25:1 and a $SiO_2$ concentration of 242 g/l as a dispersant, in an amount sufficient to provide 0.06 percent of $SiO_2$ based on the weight of the zinc oxide. The slurry had a pH of 7.9 and a viscosity of 14 cps measured on a Brookfield viscometer Model RVT using a No. 2 spindle.

The slurry then was transferred to a stainless steel beaker equipped with an agitator and temperature sensor. The slurry was heated to a temperature of about 90° C. and maintained at this temperature throughout the remainder of the treatment process. The pH of the slurry was adjusted to 9.0 utilizing 1 ml of a 5N NaOH solution.

Following adjustment of the slurry pH, further addition of the above sodium silicate solution was commenced and continued over a period of 119 minutes to effect the deposit of a dense amorphous silica coating containing about 8 percent of $SiO_2$. During this period, the pH profile of the slurry was controlled by the concurrent, but separate, addition of a 10 weight percent sulfuric acid solution. The manner in which the pH profile of the slurry was controlled was as follows: during the first 15 minute period of the sodium silicate solution addition, a sufficient amount of the sulfuric acid solution was added to maintain the slurry pH in the range of 9.0±0.25; during the next 15-minute period sufficient sulfuric acid was added to maintain the slurry pH in the range of 9.5±0.25 and during a third 15-minute period sufficient acid was added to maintain the pH slurry in the range of 9.75±0.25. Over the remaining 74 minutes of the deposition period, sulfuric acid addition was continued to maintain the slurry pH in the range of 10.0±0.25.

Upon completion of the sodium silicate addition, the slurry pH was again adjusted to about 6.0 over a period of 30 minutes by addition of further sulfuric acid. A sodium aluminate solution, containing an $Al_2O_3$ concentration of 228 g/l, then was introduced into the slurry in an amount sufficient to effect the deposition upon the silica coated zinc oxide of a precipitated alumina coating containing about 2 weight percent $Al_2O_3$ over a period of 20 minutes. During this time the slurry pH was maintained in the range of 6.0±0.5 by the concurrent, but separate, addition of a 95 weight percent sulfuric acid solution.

At the conclusion of the addition of the sodium aluminate solution, the slurry was aged for a period of 15 minutes at 90° C. and then filtered. The resulting filter cake was washed to remove byproduct sodium sulfate, dried overnight at 105° C. and micropulverized. The recovered pigmentary composition was comprised of particles having cores of pigmentary zinc oxide having deposited thereon a first coating of dense amorphous silica containing about 8 weight percent of $SiO_2$ and a second coating of precipitated alumina containing about 2 weight percent of $Al_2O_3$. The above prepared pigmentary zinc oxide composition possesses excellent chemical inertness as demonstrated in the Examples 6–10 hereinbelow and exhibits the desired UV light absorption characteristics as evidenced by the sharp rise in its absorption of light beginning at a wavelength of about 390 nm and reaching a plateau at a wavelength of about 380 nm as determined by diffuse reflectance spectroscopy. This plateau, representing maximum absorption of UV light, continues to below about 290 nm.

EXAMPLE 2

This example illustrates a further embodiment of this invention comprising the preparation of a silica and alumina coated pigmentary zinc oxide having an encapsulating coating of a metallic soap, i.e., zinc stearate, deposited thereon.

Five thousand (5,000) grams of zinc oxide manufactured by the Zinc Corporation of America and bearing the grade designation Kadox 930 were dispersed in sufficient water using a four blade (45 pitch) turbine agitator to produce a slurry containing a solids content of about 30 weight percent. The slurry was heated to a temperature of about 90° C. and maintained at this temperature throughout the remainder of the treatment process. The pH of the slurry was adjusted to a value of about 9.0 using 5.2 mls of a 5N NaOH solution.

Following adjustment of the slurry pH, addition of a sodium silicate solution, having a weight ratio of $SiO_2$:-$Na_2O$ of about 3.25:1 and a $SiO_2$ concentration of 240 g/l was commenced and continued over a period of 120 minutes to effect the deposit of a first coating of a dense amorphous silica containing about 8 weight percent of $SiO_2$ upon the zinc oxide. During this period, the pH profile of the slurry was controlled by the concurrent, but separate, addition of a 10 weight percent sulfuric acid solution. The manner in which the pH profile of the slurry was controlled was as follows: during the first 15 minutes of sodium silicate addition sufficient sulfuric acid solution was added to maintain the slurry pH in the range of 9.0±0.25; during the next 15 minute period sufficient sulfuric acid solution was added to maintain the slurry pH in the range of 9.5±0.25 and during a third 15 minute period sufficient sulfuric acid solution was added to maintain the slurry pH in the range of 9.75±0.25. Over the remaining 75 minutes of the sodium silicate addition and deposition period sulfuric acid addition was continued to maintain the slurry pH in the range of 10.0±0.25.

At the conclusion of the sodium silicate addition the slurry pH was again adjusted to a value of about 6.0 over a 30 minute period using a 95 weight percent sulfuric acid solution. A sodium aluminate solution, containing an $Al_2O_3$ concentration of 280 g/l then was introduced into the slurry in an amount sufficient to provide a second coating containing about 2 weight percent of precipitated alumina upon the silica coated zinc oxide particles over a period of 20 minutes. During this time, the slurry pH was maintained in the range of 6.0±0.5 by the concurrent, but separate, addition of further 95 weight percent sulfuric acid solution.

At the conclusion of the addition of the sodium aluminate solution the slurry was aged for 15 minutes at the end of which time the slurry pH was 6.2. To this slurry then was added 1,856 mls of a hot (i.e., 80° C.) sodium stearate solution containing 50 grams of sodium stearate. Upon completion of the addition of the sodium stearate solution the slurry pH was 6.6. At this time 200 mls of a solution of zinc nitrate were added to the slurry whereby an encapsulating coating of about 1 weight percent of zinc stearate was formed and precipitated upon the silica and alumina coated pigmentary zinc oxide particles. The slurry pH, which was lowered to a value of 6.3 with addition of the zinc nitrate solution, was adjusted to a value of 7.0 by the addition of 34.8 mls of the 5N NaOH solution.

The slurry then was filtered and the resulting filter cake of silica/alumina/zinc stearate coated pigmentary zinc oxide washed to remove byproduct sodium salts, dried overnight at 105° C. and micropulverized. The recovered pigmentary composition was comprised of particles having cores of pigmentary zinc oxide having deposited thereon a first coating containing about 8 weight percent of dense amorphous silica, a second coating containing about 2 weight percent of precipitated alumina and a third or encapsulating coating containing about 1 weight percent of precipitated zinc stearate. The above prepared pigmentary zinc oxide composition possessed excellent chemical inertness as demonstrated in the Examples 6–10 below. This composition also exhibits the desired UV light absorption characteristics as evidenced by the sharp rise in its absorption of light beginning at a wavelength of about 400 nm and reaching a plateau at a wavelength in the region of 330–380 nm.

EXAMPLE 3

This example illustrates the preparation of yet another composition of matter of the present invention. In this example, a pigmentary product was prepared comprising pigmentary zinc oxide particles upon which is deposited a coating of dense amorphous silica and an encapsulating coating of zinc stearate.

In this Example 3, a pigmentary zinc oxide product having deposited thereon a coating containing about 8 weight percent of dense amorphous silica and an encapsulating coating containing about 2 weight percent of zinc stearate was prepared utilizing substantially the same materials, techniques and conditions as employed in Example 2 above. The only exceptions were that in this Example 3 the alumina precipitation step was eliminated and the encapsulating coating of zinc stearate was deposited directly onto the dense amorphous silica coated pigmentary zinc oxide particles. The resulting pigmentary zinc oxide composition possessed excellent chemical inertness as demonstrated in Examples 6–10 below.

EXAMPLE 4

A further example of a composition of matter of the present invention was prepared. In this Example 4, a pigmentary product was prepared comprising pigmentary zinc oxide particles upon which is deposited a first coating of dense amorphous silica, a second coating of precipitated alumina and a third or encapsulating coating of calcium rosinate.

In this Example 4, a pigmentary zinc oxide product having deposited thereon a first coating containing about 8 weight percent of dense amorphous silica and a second coating containing about 2 weight percent of precipitated alumina first was prepared utilizing the same quantities of materials and process techniques as employed in Example 1 above. However, in this Example and before separation of the coated pigment from the slurry, the slurry pH was adjusted to a value of 6.0 by addition thereto of a quantity of 95 weight percent sulfuric acid solution. To the pH adjusted slurry then were added 600 mls of a solution of sodium hydroxide saponified resin acids. This solution was prepared by dissolving 20 grams of Staybelite resin (manufactured by Hercules, Inc.) in 600 mls of water containing 5.6 grams of sodium hydroxide and heated to a temperature of about 80° C. Concurrently with the addition of this saponified solution, 50 mls of an aqueous solution containing 7.7 grams of calcium chloride also were added to the slurry. Both solutions, i.e., the saponified solution of resin acids and the calcium chloride solution, were added at flow rates sufficient to complete the additions thereof within a period of about 10 minutes.

The resulting dense amorphous silica, precipitated alumina and calcium rosinate coated pigmentary zinc oxide particles then were recovered by filtration. The resulting wet filtercake, after washing to remove water soluble byproduct sodium salts, was dried overnight at 105° C. and micropulverized to particles of desired size. As with the previous Examples 1 and 2, the resulting coated pigmentary zinc oxide product exhibits excellent chemical inertness and a sharp rise in the absorption of light at about 400 nm, reaching a plateau in the range of from about 330 to about 380 nm.

EXAMPLE 5

As a further example of the compositions of matter of the present invention the following coated pigmentary zinc oxide product was prepared.

Fifteen hundred (1,500) grams of zinc oxide manufactured by the Zinc Corporation of America and having the designation of Kadox 930, were dispersed in water, again employing a four blade turbine agitator. The resulting slurry contained 30 weight percent of the solid zinc oxide dispersed therein. A sodium silicate solution having a weight ratio of $SiO_2:Na_2O$ of about 3.25:1 and containing a concentration of $SiO_2$ of 242 g/l was added to the slurry as a dispersant. The slurry was heated to a temperature of 80° C. and maintained at this temperature throughout the remainder of the coating process.

To the above slurry of pigmentary zinc oxide, the pH of which was 8.5, were added 2,500 mls of a hot (i.e., 80° C.) solution of sodium stearate containing sodium stearate in a concentration of 29.1 g/l of solution. Upon completion of the addition of this sodium stearate solution the slurry pH had risen to a value of 10.5. To the slurry then were added 100 mls of a zinc nitrate solution containing 352 g/l of zinc nitrate hexahydrate. The addition of this solution was effected over a period of 40 minutes at the end of which time the slurry pH measured 6.7. The resulting zinc stearate coated pigmentary zinc oxide particles were cured for a period of 20 minutes then recovered from the slurry by filtration and dried overnight at 105° C. The dried product was micropulverized and tested for UV light absorption using diffuse reflectance spectroscopy techniques. As in the previous Examples 1–5, the zinc stearate coated pigmentary zinc oxide possessed an excellent chemical inertness and a well defined UV light absorption edge at about 400 nm which reached a plateau at a wavelength between about 330 and 380 nm.

EXAMPLES 6–10

These examples illustrate the use of the coated pigmentary zinc oxide compositions from Examples 1–5 above in preparing UV light stabilized polymeric resin compositions of the present invention and the inability of said pigmentary zinc oxide compositions to accelerate the degradation of the resin component contained therein.

In each of these examples, a UV light stabilized polymeric resin composition was prepared by dry blending 6.03 g of one of the treated pigmentary zinc oxide compositions of Examples 1–5 with 67.0 g of a poly(vinylchloride) siding formulation containing 31.6 g of rigid poly(vinylchloride) resin, 4.7 g of Thermolite T137, a tin based thermal stabilizer available from M & T Chemicals, Inc., 4.0 g of calcium stearate, 3.1 g of Hostalub XL165, a lubricant available from the Hoechst Celanese Corporation, K120N Acryloid, a processing aid available from the Rohm & Haas Company and 18.9 g of chlorinated polyethylene. Each of the dry blended mixtures then was introduced into a Brabender plastograph mixer wherein it was kneaded into an elastic dough at a rotational speed of 120 rpm and at a temperature of 180° C. over a period of 7 minutes. No evidence of degradation of the poly(vinylchloride) in the elastic doughs was observed upon their removal from the Brabender. Portions of each of the elastic doughs prepared above were hot-pressed into sheets at a temperature of 193° C. and a ram pressure in the range of from about 30,000 to about 35,000 psig for a period of 1 minute. The sheets, when removed from the press, were completely white indicating that no degradation of the poly(vinylchloride) in the sheets had taken place.

COMPARATIVE EXAMPLE

The procedures used in each of Examples 6–10 were repeated using the same rigid poly(vinylchloride) siding formulation and amount thereof but in which was incorporated 6.03 g of a noncoated pigmentary zinc oxide. Upon discharge of the resulting elastic dough from the Brabender, numerous black spots were observed to be present in the dough. These black spots continued to grow in size and within a period of a few minutes the dough had degraded into a useless black mass.

This comparative example demonstrates the inherent tendency of noncoated pigmentary zinc oxide to accelerate the degradation of the formulated poly(vinylchloride) resin. In contrast, the formulated poly(vinylchloride) resins of each of Examples 6–10 and containing the treated pigmentary zinc oxide compositions of Examples 1–5 respectively, were found to be completely stable during processing. These results clearly indicate the chemical inertness of the treated pigmentary zinc oxide compositions of matter of the present invention and the stability of poly(vinylchloride) resin compositions formulated therewith.

In summary, this invention provides for ultraviolet light absorbing, chemically inert pigmentary zinc oxide compositions of matter, for processes for their preparation and for polymeric resin compositions containing said pigmentary zinc oxide compositions which resin compositions exhibit good stability. The benefits provided by this invention are both surprising and unexpected. This particularly is true when viewed in light of what is known of conventional untreated zinc oxides and the deleterious effect such untreated zinc oxides exert upon polymeric resins as demonstrated above with rigid poly(vinylchloride) resin based formulations.

While this invention has been described in terms of what is believed to be the preferred embodiments, it is to be understood that changes may be made thereto without departing from the spirit and scope thereof.

We claim:

1. Ultraviolet light absorbing chemically inert compositions of matter comprised of particles having cores of chemically reactive pigmentary zinc oxide, said cores having deposited thereon one or more chemically inert coatings, said coatings comprising either (a) a precipitated encapsulating coating of a water insoluble metallic soap of a saturated or unsaturated monocarboxylic acid, wherein said monocarboxylic acid is selected from the group consisting of fatty acids, resin acids and naphthenic acids containing from 7 to 22 carbon atoms and wherein said metallic soap is formed by reaction of a water soluble alkali metal salt of said monocarboxylic acid with a water soluble metallic salt comprised of a metal cation selection from Groups IB, II, III, IV, V, VIB, VIIB and VIII of the Periodic Table of the Elements and an inorganic anion moiety selected from the group consisting of nitrate, sulfate and halogen ions, (b) separate and distinct coatings of at least two different hydrous metal oxides and, optionally, a further precipitated encapsulating coating of said water insoluble metallic soap of said monocarboxylic acid as described hereinabove, or (c) a coating of a single hydrous metal oxide selected from the group consisting of silica, titania, alumina and zirconia and a further precipitated encapsulating coating of said water insoluble metallic soap of said monocarboxylic acid as described hereinabove.

2. The compositions of matter of claim 1 wherein said cores of said pigmentary zinc oxide have deposited thereon said separate and distinct coatings of said at least two different hydrous metal oxides, said metal oxides comprising silica and alumina.

3. The compositions of matter of claim 2 wherein said separate and distinct coatings deposited upon said cores of pigmentary zinc oxide comprise a first coating of from about 0.1 to about 25 weight percent, preferably from about 1 to about 15 weight percent, of dense amorphous silica and a second coating of from about 0.5 to about 10 weight percent, preferably from about 1 to about 4 weight percent, of precipitated alumina, the percentages of said silica and alumina coatings being based on the weight of said cores of said pigmentary zinc oxide.

4. The compositions of matter of claim 2 wherein said cores of said pigmentary zinc oxide range in size from about 0.01 to about 10.0 micron.

5. The compositions of matter of claim 2 further comprising said optional precipitated encapsulating coating of said water insoluble metallic soap of said monocarboxylic acid, wherein said alkali metal salt of said monocarboxylic acid utilized to form said coating of said water insoluble metallic soap comprises a sodium or potassium salt of a fatty acid or resin acid.

6. The compositions of matter of claim 5 wherein said alkali metal salt comprises a sodium or potassium salt of a fatty acid selected from the group consisting of lauric, palmitic, stearic, oleic and linoleic acids.

7. The compositions of matter of claim 5, wherein said optional precipitated encapsulating coating of said water insoluble metallic soap of said monocarboxylic acid ranges in weight from about 0.1 to about 10 weight percent, preferably from about 0.5 to about 5 weight percent, based on the weight of said cores of said pigmentary zinc oxide.

8. The compositions of matter of claim 1, wherein said cores of said pigmentary zinc oxide have deposited directly thereon said precipitated encapsulating coating of said water insolvable metallic soap of said saturated and unsaturated monocarboxylic acid, said coating ranging in weight from about 0.1 to about 10 weight percent, preferably from about 0.5 to about 5 weight percent, based on the weight of said cores of said pigmentary zinc oxide.

9. The compositions of matter of claim 8, wherein said water insoluble metallic soap of said monocarboxylic acid is formed by reaction of said alkali metal salt, said salt comprising a sodium or potassium salt of a fatty acid selected from the group consisting of lauric, palmitic, stearic, oleic and linoleic acids and resin acids, with a water soluble metallic salt comprising zinc nitrate or calcium chloride.

10. A process for producing ultraviolet light absorbing chemically inert compositions of matter comprised of particles having cores of pigmentary zinc oxide, said cores having deposited thereon separate and distinct coatings of two different hydrous metal oxides, said process comprising:

forming an aqueous slurry containing from about 5 to about 50 weight percent based upon the total weight of said aqueous slurry of chemically reactive pigmentary zinc oxide core particles;

heating said aqueous slurry to an elevated temperature of from about 60° C. to about 95° C.;

adding to said heated slurry a first hydrous metal oxide precursor compound while maintaining the pH of said heated slurry at a value of about 9.0 by concurrently adding a mineral acid to said heated slurry, to effect a deposition of a first coating of a first hydrous metal oxide upon said pigmentary zinc oxide core particles;

adjusting the pH of said heated slurry of said first hydrous metal oxide coated pigmentary zinc oxide core particles to a value of about 6.5 or lower by addition of further of said mineral acid thereto;

adding to said heated slurry of said first hydrous metal oxide coated pigmentary zinc oxide core particles a second hydrous metal oxide precursor compound, while maintaining the pH of said heated slurry at about 6.5 and lower by concurrently adding said mineral acid to said slurry, to effect a deposition upon said first hydrous metal oxide coated pigmentary zinc oxide core particles of a second coating of a second hydrous metal oxide and thereby produce a slurry containing a chemically inert pigmentary zinc oxide composition;

curing said chemically inert pigmentary zinc oxide composition; and recovering said cured chemically inert pigmentary zinc oxide composition from said slurry substantially as produced.

11. The process of claim 10 wherein said first hydrous metal oxide precursor compound and said acid are added to said heated slurry in such proportions to effect a stepwise, incremental increase in the pH of said heated slurry from said pH of at least about 9.0 to a pH of about 10.5 to effect a deposition of said inner coating of said first hydrous metal oxide upon said zinc oxide core particles.

12. The process of claim 10 wherein said first hydrous metal oxide precursor compound comprises an alkali metal silicate and said second hydrous metal oxide precursor compound comprises a water soluble aluminum-containing compound.

13. The process of claim 12 wherein said alkali metal silicate is sodium silicate and said water soluble aluminum-containing compound is an alkali metal aluminate comprising sodium aluminate.

14. The process of claim 13 wherein said first coating of said first hydrous metal oxide comprises a coating of dense amorphous silica and said second coating of said second hydrous metal oxide comprises a coating of precipitated alumina.

15. The process of claim 14 wherein said sodium silicate is added to said heated slurry in an amount whereby said first coating of said dense amorphous silica deposited upon said zinc oxide particles contains from about 0.1 to about 25 weight percent of silica, preferably from about 1 to about 15 weight percent of silica, and wherein said sodium aluminate is added to said heated slurry in an amount whereby said second coating of said precipitated alumina contains from about 0.5 to about 10 weight percent of alumina, preferably from about 1 to about 4 weight percent of alumina, all percentages being based upon the pigmentary zinc oxide core particles.

16. The process of claim 10 further comprising:
adding to said heated slurry containing said cured, chemically inert pigmentary zinc oxide composition a water soluble alkali metal salt of a saturated or unsaturated monocarboxylic acid wherein said monocarboxylic acid is selected from the group consisting of fatty acids, resin acids and naphthenic acids containing from 7 to 22 carbon atoms and a water soluble metallic salt comprised of a metal cation selected from Groups IB, II, III, IV, V, VIB, VIIB and VIII of the Periodic Table of the Elements and an inorganic anion moiety selected from the group consisting of nitrate, sulfate and halogen ions to effect the formation and precipitation, in situ, of a water insoluble metallic soap of said saturated or unsaturated monocarboxylic acid upon and an encapsulation of said cured, chemically inert pigmentary zinc oxide composition with a precipitated coating of said water insoluble metallic soap and thereby produce a slurry containing a cured, chemically inert pigmentary zinc oxide composition comprised of particles having cores of pigmentary zinc oxide said cores having deposited thereon said first coating of said first hydrous metal oxide, said second coating of a different second hydrous metal oxide and said precipitated encapsulating coating of said metallic soap of said saturated or unsaturated monocarboxylic acid.

17. The process of claim 16 wherein said added water soluble alkali metal salt is a sodium or potassium salt of a fatty acid selected from the group consisting of lauric, palmitic, stearic, oleic and linoleic acids or a resin acid.

18. The process of claim 16 wherein said added water soluble alkali metal salt is sodium stearate or sodium rosinate and said added water soluble metallic salt is zinc nitrate or calcium chloride.

19. The process of claim 16 wherein said water soluble alkali metal salt and said water soluble metallic salt are added to said heated slurry of cured, chemically inert pigmentary zinc oxide in amounts whereby said precipitated encapsulating coating of said water insoluble metallic soap formed therefrom ranges in weight of from about 0.1 to about 10 weight percent, preferably from about 0.5 to about 5 weight percent, based on the weight of the zinc oxide core particles.

20. A process for producing ultraviolet light absorbing chemically inert compositions of matter comprised of particles having cores of pigmentary zinc oxide said cores having deposited thereon a precipitated encapsulating coating of a water insoluble metallic soap of a saturated or unsaturated monocarboxylic acid said process comprising:
forming an aqueous slurry containing from about 5 to about 50 weight percent based on the total weight of said aqueous slurry of chemically reactive pigmentary zinc oxide core particles and heating said slurry to an elevated temperature of from about 60° C. to about 95° C.;
adding to said heated slurry a water soluble alkali metal salt of a saturated or unsaturated monocarboxylic acid selected from the group consisting of fatty acids, resin acids and napthenic acids containing from 7 to 22 carbon atoms and a water soluble metallic salt comprised of a metal cation selected from Groups IB, II, III, IV, V, VIB, VIIB, and VIII of the Periodic Table of the Elements and an inorganic anion moiety selected from the group consisting of nitrate, sulfate and halogen ions to effect the formation and precipitation, in situ, of said water soluble metallic soap of said saturated or unsaturated monocarboxylic acid and a deposition of said water insoluble metallic salt upon said pigmentary zinc oxide core particles to thereby produce a slurry containing a chemically inert composition of matter comprised of particles having cores of pigmentary zinc oxide said cores having deposited thereon said precipitated encapsulating coating of said water insoluble metallic salt of said saturated and unsaturated monocarboxylic acid; and
recovering said chemically inert composition of matter substantially as produced.

21. The process of claim 20 wherein said added water soluble alkali metal salt is a sodium or potassium salt of a fatty acid selected from the group consisting of lauric, palmitic, stearic, oleic and linoleic or a resin acid.

22. The process of claim 21 wherein said added water soluble alkali metal salt is sodium stearate or sodium rosinate and said added water soluble metallic salt is zinc nitrate or calcium chloride.

23. The process of claim 20 wherein said water soluble alkali metal salt and said water soluble metallic salt are added to said heated slurry in amounts wherein said precipitated encapsulating coating of said water insoluble metallic soap formed therefrom ranges in weight from about 0.1 to about 10 weight percent, preferably from about 0.5 to about 5 weight percent, based on the weight of the zinc oxide core particles.

24. The compositions of matter of claim 1 wherein said cores of said pigmentary zinc oxide have deposited thereon from about 0.1 to about 25 weight percent of said coating of said single hydrous metal oxide and from about 0.1 to about 10 weight percent of said precipitated encapsulating coating of said water insoluble metallic soap of said monocarboxylic acid.

25. The compositions of matter of claim 22 wherein said coating of said single hydrous metal oxide comprises either from about 1 to about 15 weight percent of dense amorphous silica or from about 1 to about 4 weight percent of precipitated alumina.

26. The compositions of matter of claim 22 wherein said precipitated encapsulating coating of said water insoluble metallic soap is formed by the reaction of a water soluble alkali metal salt comprising a sodium or potassium salt of fatty acid selected from the group consisting of lauric, palmitic, stearic, oleic and linoleic acids or a resin acid with a water soluble metallic salt comprising zinc nitrate or calcium chloride.

27. A process for producing ultraviolet light absorbing chemically inert compositions of matter comprised of particles having cores of pigmentary zinc oxide, said cores having deposited thereon a coating of a single hydrous metal oxide and a precipitated encapsulating coating of a water insoluble metallic soap of a monocarboxylic said process comprising:

forming an aqueous slurry, containing from about 5 to about 50 weight percent based on the total weight of said aqueous slurry, of chemically reactive pigmentary zinc oxide particles and heating said slurry to an elevated temperature of from about 60° C. to about 95° C.;

adding to said heated slurry a hydrous metal oxide precursor compound while maintaining the pH of said heated slurry at a value sufficient to effect formation and deposition of said hydrous metal oxide as a coating upon said pigmentary zinc oxide core particles;

adding to said heated slurry containing said hydrous metal oxide core particles a water soluble alkali metal salt of a saturated or unsaturated monocarboxylic acid wherein said monocarboxylic acid is selected from the group consisting of fatty acids, resin acids and naphthenic acids containing from 7 to 22 carbon atoms and a water soluble metallic salt comprised of a metal cation selected from Groups IB, II, III, IV, V, VIB, VIIB and VIII of the Periodic Table of the Elements and an inorganic anion moiety selected from the group consisting of nitrate, sulfate and halogen ions to effect the formation and precipitation, in situ, of said saturated or unsaturated monocarboxylic acid upon and an encapsulation of said hydrous metal oxide coated pigmentary zinc oxide core particles with a precipitated coating of said metallic soap to thereby produce a slurry containing said chemically inert composition of matter comprised of particles having cores of pigmentary zinc oxide said cores having deposited thereon said coating of said hydrous metal oxide and said precipitated encapsulating coating of said metallic soap of said saturated or unsaturated monocarboxylic acid; and recovering said chemically inert composition of matter substantially as produced.

28. The process of claim 27 wherein said hydrous metal oxide precursor compound comprises an alkali metal silicate and preferably sodium silicate.

29. The process of claim 27 wherein said added water soluble alkali metal salt is a sodium or potassium salt of a fatty acid selected from the group consisting of lauric, palmitic, stearic, aleic and linoleic acids or a resin acid.

30. The process of claim 27 wherein said added water soluble alkali metal salt is sodium stearate or sodium rosinate and said added water soluble metallic salt is zinc nitrate or calcium chloride.

31. The process of claim 27 wherein said water soluble alkali metal salt and said water soluble metallic salt are added to said heated slurry containing said hydrous metal oxide coated pigmentary zinc oxide core particles in amounts wherein said precipitated encapsulating coating of said water insoluble metallic soap formed therefrom ranges in weight from about 0.1 to about 10 weight percent, preferably from about 0.5 to about 5 weight percent, based on the weight of the zinc oxide core particles.

32. An ultraviolet light stabilized polymeric resin composition comprised of an ultraviolet degradable polymeric resin component and an effective ultraviolet light stabilizing amount of an ultraviolet light absorbing chemically inert pigmentary zinc oxide composition of matter of claim 1.

33. The ultraviolet light stabilized polymeric resin composition of claim 32 wherein the amount of said chemically inert pigmentary zinc oxide ranges from about 2 to about 20 weight percent based on 100 parts by weight of said resin composition.

34. The ultraviolet light stabilized polymeric resin composition of claim 33 in the form of a coating, a film, a sheet or a molded or extruded article.

35. The ultraviolet light stabilized polymeric resin composition of claim 33 wherein said polymeric resin component is a poly(vinylhalide) resin selected from the group consisting of poly(vinylchloride) homo- and copolymer resins.

36. The ultraviolet light stabilized polymeric resin composition of claim 35 wherein said poly(vinylchloride) resin is a rigid poly(vinylchloride) homopolymer resin.

37. The ultraviolet light stabilized polymeric resin composition of claim 36 in the form of a coating, a film, a sheet or a molded or extruded article.

* * * * *